(12) United States Patent
Zhang

(10) Patent No.: US 11,018,864 B2
(45) Date of Patent: May 25, 2021

(54) METHOD, DEVICE, AND SYSTEM FOR TASK PROCESSING

(71) Applicant: Alibaba Group Holding Limited, Grand Cayman (KY)

(72) Inventor: Xiaoyu Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 114 days.

(21) Appl. No.: 16/169,836

(22) Filed: Oct. 24, 2018

(65) Prior Publication Data

US 2019/0123902 A1 Apr. 25, 2019

(30) Foreign Application Priority Data

Oct. 25, 2017 (CN) .......................... 201711015972.8

(51) Int. Cl.
*H04L 9/30* (2006.01)
*G06F 7/72* (2006.01)
*H04L 9/32* (2006.01)
*G09C 1/00* (2006.01)

(52) U.S. Cl.
CPC .............. *H04L 9/302* (2013.01); *G06F 7/722* (2013.01); *G09C 1/00* (2013.01); *H04L 9/3249* (2013.01); *G06F 2207/3828* (2013.01); *H04L 2209/12* (2013.01); *H04L 2209/122* (2013.01)

(58) Field of Classification Search
CPC ... H04L 9/302; H04L 9/3249; H04L 2209/12; H04L 2209/122; G06F 7/722; G06F 2207/3828; G09C 1/00
See application file for complete search history.

(56) References Cited

U.S. PATENT DOCUMENTS

| 5,513,133 | A * | 4/1996 | Cressel ................... G06F 7/728 708/491 |
| 6,230,179 | B1 * | 5/2001 | Dworkin .................. G06F 7/72 708/492 |
| 6,349,318 | B1 * | 2/2002 | Vanstone .................. G06F 7/72 708/492 |
| 6,397,241 | B1 * | 5/2002 | Glaser ..................... G06F 7/722 708/625 |
| 6,973,470 | B2 * | 12/2005 | Takahashi ............... G06F 7/722 708/491 |
| 8,176,109 | B2 * | 5/2012 | Fischer ................... G06F 7/722 708/490 |
| 8,995,651 | B1 * | 3/2015 | Lee .......................... G06F 7/72 380/30 |
| 9,092,645 | B2 * | 7/2015 | Ozturk .................... G06F 7/723 |
| 9,268,564 | B2 * | 2/2016 | Gueron ................. G06F 9/3001 |
| 9,444,623 | B2 * | 9/2016 | Kocher ................... H04L 9/302 |
| 10,187,208 | B2 * | 1/2019 | Lu ........................... G06F 7/722 |
| 2001/0010077 | A1 * | 7/2001 | McGregor .............. B43L 15/00 713/174 |
| 2002/0110240 | A1 * | 8/2002 | Chen ...................... G06F 7/722 380/28 |
| 2002/0116429 | A1 * | 8/2002 | Chen ...................... G06F 7/722 708/491 |

(Continued)

*Primary Examiner* — Joseph P Hirl
*Assistant Examiner* — Stephen T Gundry

(57) ABSTRACT

A number of RSA computing tasks that have different word lengths which are less than a maximum word length of an operand register are processed at the same time by combining a number of different word lengths to be equal to or less than the maximum word length of the operand register.

18 Claims, 10 Drawing Sheets

(56) References Cited

U.S. PATENT DOCUMENTS

| | | | |
|---|---|---|---|
| 2002/0116430 A1* | 8/2002 | Chen | G06F 7/722 |
| | | | 708/491 |
| 2002/0194237 A1* | 12/2002 | Takahashi | G06F 7/728 |
| | | | 708/491 |
| 2003/0009503 A1* | 1/2003 | Glaser | G06F 7/724 |
| | | | 708/625 |
| 2003/0120915 A1 | 6/2003 | Kleinsteiber et al. | |
| 2003/0158971 A1 | 8/2003 | Renanarayanan et al. | |
| 2003/0163682 A1 | 8/2003 | Kleinsteiber et al. | |
| 2003/0163692 A1 | 8/2003 | Kleinsteiber et al. | |
| 2003/0163727 A1 | 8/2003 | Hammons et al. | |
| 2003/0167307 A1 | 9/2003 | Filepp et al. | |
| 2005/0268091 A1 | 12/2005 | Renganarayanan et al. | |
| 2006/0005233 A1 | 1/2006 | Kleinsteiber et al. | |
| 2006/0008080 A1* | 1/2006 | Higashi | G06F 7/728 |
| | | | 380/28 |
| 2006/0010191 A1* | 1/2006 | Takahashi | G06F 7/728 |
| | | | 708/491 |
| 2006/0023878 A1 | 2/2006 | Son | |
| 2006/0064453 A1* | 3/2006 | Fischer | G06F 7/722 |
| | | | 708/620 |
| 2006/0080727 A1 | 4/2006 | Hammons et al. | |
| 2007/0055879 A1* | 3/2007 | Luo | H04L 9/302 |
| | | | 713/171 |
| 2007/0083586 A1* | 4/2007 | Luo | G06F 7/535 |
| | | | 708/502 |
| 2007/0100925 A1* | 5/2007 | Fischer | G06F 7/722 |
| | | | 708/620 |
| 2007/0100926 A1* | 5/2007 | Fischer | G06F 7/722 |
| | | | 708/620 |
| 2007/0116270 A1* | 5/2007 | Fischer | G06F 7/722 |
| | | | 380/30 |
| 2007/0125866 A1 | 6/2007 | Nishizawa et al. | |
| 2007/0260664 A1* | 11/2007 | Bertoni | G06F 7/728 |
| | | | 708/490 |
| 2007/0297601 A1 | 12/2007 | Hasenplaugh et al. | |
| 2007/0299899 A1 | 12/2007 | Hasenplaugh et al. | |
| 2008/0025502 A1* | 1/2008 | Kounavis | H04L 9/302 |
| | | | 380/30 |
| 2008/0065714 A1* | 3/2008 | Fishcher | G06F 7/722 |
| | | | 708/620 |
| 2008/0072309 A1 | 3/2008 | Kleinsteiber et al. | |
| 2008/0140753 A1 | 6/2008 | Gopal et al. | |
| 2008/0144811 A1* | 6/2008 | Gopal | H04L 9/302 |
| | | | 380/30 |
| 2009/0077618 A1 | 3/2009 | Pearce et al. | |
| 2009/0310775 A1* | 12/2009 | Gueron | H04L 9/0643 |
| | | | 380/28 |
| 2009/0319804 A1* | 12/2009 | Qi | H04L 9/302 |
| | | | 713/190 |
| 2010/0088526 A1* | 4/2010 | Kumar | G06F 7/722 |
| | | | 713/193 |
| 2010/0332578 A1 | 12/2010 | Gopal et al. | |
| 2011/0270902 A1 | 11/2011 | Dimitrov et al. | |
| 2012/0057695 A1 | 3/2012 | Lazich et al. | |
| 2012/0098642 A1 | 4/2012 | Krawczewicz et al. | |
| 2012/0197956 A1* | 8/2012 | Fischer | G06F 7/722 |
| | | | 708/530 |
| 2013/0297919 A1 | 11/2013 | Kang et al. | |
| 2014/0229716 A1* | 8/2014 | Gueron | G06F 9/3001 |
| | | | 712/222 |
| 2015/0082047 A1* | 3/2015 | Ozturk | H04L 9/3006 |
| | | | 713/189 |
| 2015/0180652 A1* | 6/2015 | Kocher | H04L 9/302 |
| | | | 380/28 |
| 2015/0207785 A1 | 7/2015 | Sathaye et al. | |
| 2015/0355949 A1 | 12/2015 | Bass et al. | |
| 2016/0308676 A1 | 10/2016 | Lu et al. | |

* cited by examiner

METHOD, DEVICE, AND SYSTEM FOR TASK PROCESSING

CROSS-REFERENCE TO RELATED APPLICATIONS

This application claims priority to Chinese Patent Application No. 201711015972.8, filed on Oct. 25, 2017, which is incorporated herein by reference in its entirety.

BACKGROUND OF THE INVENTION

1. Field of the Invention

The present application relates to data processing and, in particular, to a task processing method, device, and system.

2. Description of the Related Art

RSA is an important asymmetric signature/encryption algorithm that is widely applied in existing network communications (such as HTTPS). In order to ensure the encryption and decryption performance of RSA, corresponding acceleration units are generally used to respectively implement the two main arithmetic operations: modular squaring (squaring and modulo) and modular multiplication (multiplication and modulo). The main arithmetic process of RSA is to use the two arithmetic units for iterative computation. The sequence of processing is obtained through transforming input exponents.

The hardware acceleration units allow computationally intensive RSA operations to be performed independently from the CPU so that the CPU can handle more requests related to protocol stack and operating system. In hardware acceleration solutions, the common practice is to configure all base numbers, exponents, and modulus values into hardware acceleration units, and then unload the computing tasks. In order to support RSA computing tasks in different modes, such as RSA-4096, RSA-2048, and RSA-1024, issues such as reconstruction design, resource reuse, and parallel task computation of hardware logic circuits become key technical points that need to be addressed urgently.

For the RSA computing tasks of different word lengths, the three common word lengths RSA-4096, RSA-2048, and RSA-1024 can be used as examples to design the RSA-4096 modular exponentiation module. For the two modes RSA-2048 and RSA-1024, high-order bits of operands are zero-padded and then the module of RSA-4096 is still used for computation. Although this approach ensures that computing tasks in each word length can be accomplished with the highest possible throughput, a lot of resources are wasted due to the high-order zero-padding operation. Hardware for implementing RSA is hereinafter referred to as an RSA operation module.

FIG. 1 shows a block diagram that illustrates a conventional RSA operation module 100. As shown in FIG. 1, RSA operation module 100 includes a controller 110 that generates the correct control sequence in the iterative process of the whole modular exponentiation. Module 100 also includes an exponent shifter 112, and a register file 114 that stores base numbers, exponents, moduli, and other intermediate results from computing tasks.

In addition, module 100 also includes an operand register opA 116A and an operand register opB 116B that gates two input factors of the modular multiplier, and a modular multiplier 118. Modular multiplier 118 is the core arithmetic unit and can be regarded as the basic computing unit of modular exponentiation. (The modulus of the modular multiplier is also from the register file, which is not marked in the figure.) Controller 110 sets the input operands opA and opB of a modular multiplication unit according to the data state of the exponent shifter, accomplishes a series of modular multiplication operations by means of iteration, and updates the result of each operation.

It can be seen from the aforementioned structure that the disadvantage of this solution is that the bit widths of the input operands opA and opB are fixed for a specific hardware design. Meanwhile, since only one set of modular exponentiation operations can be accomplished at a time, hardware implementation is generally instantiated according to the supported maximum RSA bit width, which results in wasted resources and less time-efficient RSA computation that requires other bit widths (bit widths less than the maximum RSA bit width).

For example, the RSA-4096 operation module implemented using this method requires high-order zero-padding when the RSA-2048 computing task is performed, which actually uses only half of the computing resource. If the time for completing one RSA-2048 computing task is denoted as T, then the time required for N RSA-2048 computing tasks is N*T.

Thus, in the prior art, the hardware for implementing RSA can only perform one set of modular exponentiation operations at a time, and perform computation according to the maximum bit width supported by RSA, which results in the need for a high-order zero-padding operation during RSA operations with small bit width that leads to the waste of computing resources and low computing efficiency.

At present, no effective solution has been proposed to address the problem that task processing is performed based on different word length in the prior art, resulting in waste of computing resources.

SUMMARY OF THE INVENTION

The present application provides a computing device for processing multiple bit-sized computing tasks. The computing device includes a plurality of x-bit shift registers coupled in series. A number of the x-bit shift registers are gated such that an output value of an x-bit shift register can be directed to a next-register output or a controller output in response to a gating signal. The next-register output is coupled to a next x-bit shift register in the series. The computing device also includes a first n-bit operand register having a plurality of x-bit operand segments, and a second n-bit operand register having a plurality of x-bit operand segments. The computing device further includes a plurality of modular multipliers coupled to the plurality of x-bit operand segments in the first and second n-bit operand registers such that each modular multiplier is coupled to a x-bit operand segment of the first operand register and a corresponding x-bit operand segment of the second operand register. In addition, the computing device includes a controller coupled to the plurality of x-bit shift registers, the first n-bit operand register, the second n-bit operand register, and the plurality of modular multipliers. The controller to receive a first task having y bits and a second task having z bits, and divide the y-bit first task into a first plurality of x-bit segments, and the z-bit second task into a second plurality of x-bit segments. The controller to further load the first plurality of x-bit segments into a first group of shift registers of the plurality of x-bit shift registers such that each x-bit segment of the first plurality of x-bit segments is loaded into a corresponding x-bit shift register in the first group of shift registers, and the second plurality of x-bit segments into a second group of shift registers of the plurality of x-bit shift registers such that each x-bit segment of the second plurality of x-bit segments is loaded into a corresponding x-bit shift register in the second group of shift registers.

The present application also provides a method of operating a computer device to process multiple bit-sized computing tasks. The method includes receiving a first task having y bits and a second task having z bits, and dividing the y-bit first task into a first plurality of x-bit segments, and the z-bit second task into a second plurality of x-bit segments. The method also includes loading the first plurality of x-bit segments into a first group of shift registers of a plurality of x-bit shift registers such that each x-bit segment of the first plurality of x-bit segments is loaded into a corresponding x-bit shift register in the first group of shift registers, and the second plurality of x-bit segments into a second group of shift registers of the plurality of x-bit shift registers such that each x-bit segment of the second plurality of x-bit segments is loaded into a corresponding x-bit shift register in the second group of shift registers.

The present application further includes a non-transitory computer-readable storage medium having embedded therein program instructions, which when executed by a processor causes the processor to execute a method of processing multiple bit-sized computing tasks. The method includes receiving a first task having y bits and a second task having z bits, and dividing the y-bit first task into a first plurality of x-bit segments, and the z-bit second task into a second plurality of x-bit segments. The method also includes loading the first plurality of x-bit segments into a first group of shift registers of a plurality of x-bit shift registers such that each x-bit segment of the first plurality of x-bit segments is loaded into a corresponding x-bit shift register in the first group of shift registers, and the second plurality of x-bit segments into a second group of shift registers of the plurality of x-bit shift registers such that each x-bit segment of the second plurality of x-bit segments is loaded into a corresponding x-bit shift register in the second group of shift registers.

A better understanding of the features and advantages of the present application will be obtained by reference to the following detailed description and accompanying drawings which set forth an illustrative embodiment in which the principals of the application are utilized.

BRIEF DESCRIPTION OF THE DRAWINGS

The drawings described herein are provided for further understanding of the present application, and form a part of the present application. The exemplary embodiments of the present application and the description thereof are for explaining the present application and do not constitute an undue limitation to the scope of the present application.

FIG. 9A is a flowchart illustrating an example of task processing method 900, while FIG. 9B is a flowchart illustrating an example of a method 950 that implements step 916 of method 900.

DETAILED DESCRIPTION OF THE INVENTION

In order to enable a person skilled in the art to better understand solutions of the present application, the technical solutions in the embodiments of the present application will be described clearly and completely below with reference to the drawings in the embodiments of the present application. It is apparent that the described embodiments are merely some, rather than all of the embodiments of the present application. On the basis of the embodiments in the present application, all other embodiments obtained by those of ordinary skill in the art without making creative efforts shall fall within the protection scope of the present application.

It should be noted that the terms "first", "second", and the like in the description and claims of the present application and in the above drawings are used to distinguish similar objects and are not necessarily used to describe a specific sequence or order. It should be understood that these numbers may be interchanged where appropriate so that the embodiments of the present application described herein can be implemented in orders other than those illustrated or described herein.

In addition, the terms "include" and "have" and any variations thereof are intended to cover non-exclusive inclusions. For example, processes, methods, systems, products, or apparatuses that comprise a series of steps or units are not limited to steps or units that are clearly listed, but may include other steps or units not clearly listed or inherent to these processes, methods, products, or devices.

With respect to RSA, RSA is an important asymmetric signature/encryption algorithm that is widely applied in existing network communication (such as HTTPS). The RSA algorithm is an asymmetric encryption algorithm with an encryption key and a decryption key. The encryption key is a public key and the decryption key is a secret key.

Figure 1:
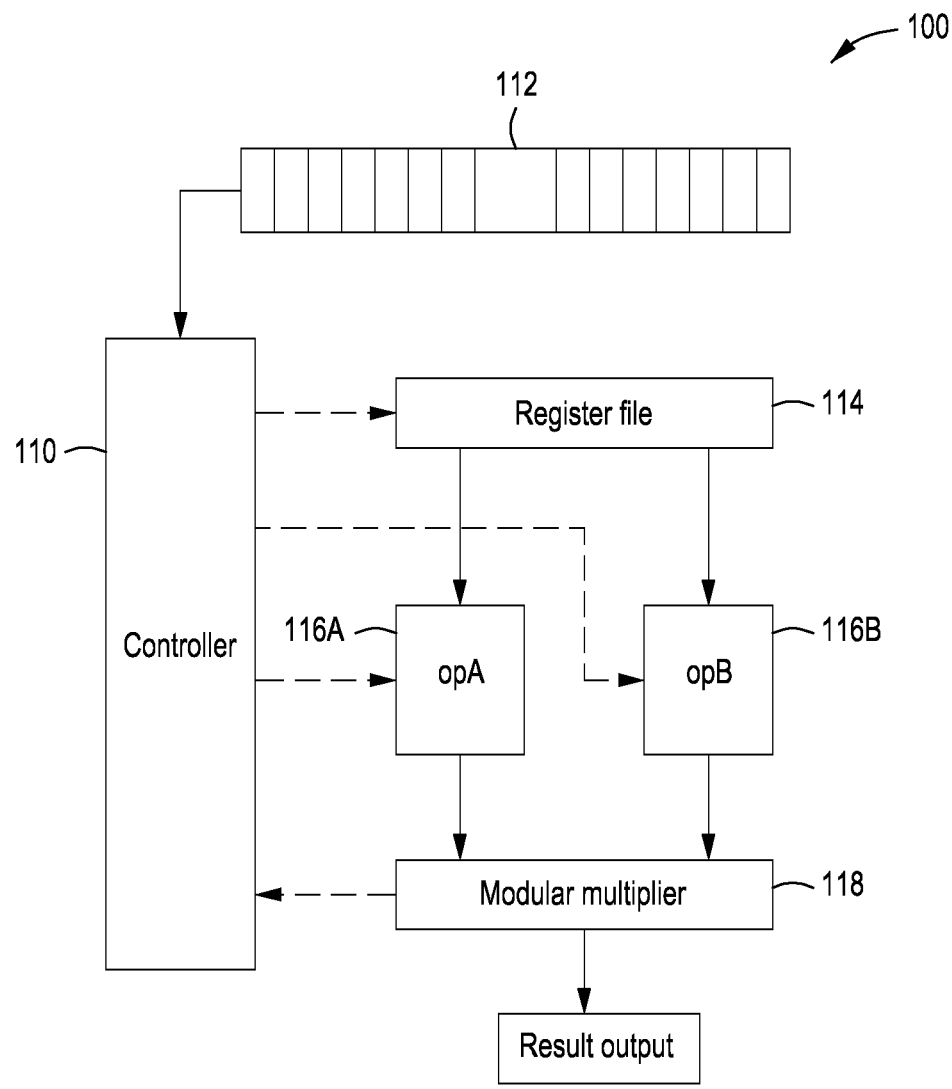
FIG. 1 is a block diagram illustrating a conventional RSA operation module 100.
Figure 2:
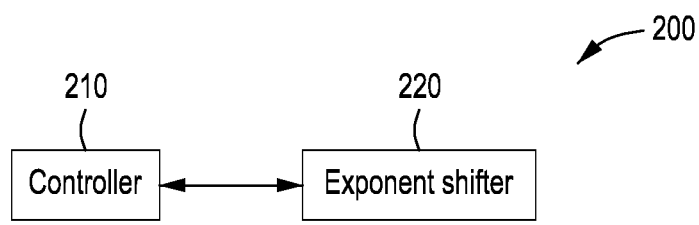
FIG. 2 is a block diagram illustrating an example of a task processing system 200 in accordance with the present application.

FIG. 2 shows a block diagram that illustrates a task processing system 200 in accordance with the present application. As shown in FIG. 2, system 200 includes a controller 210 that acquires a plurality of tasks, segments a computing resource according to an operating quantity of the plurality of tasks, and sets input operands according to a segmentation result.

Specifically, the plurality of tasks may be modular multiplication tasks in an RSA encryption operation. A key having a fixed length for use by an asymmetric encryption algorithm is obtained through modular multiplication in the RSA encryption operation. For example, if the task is RSA-2048, the task of the RSA operation module is to generate a key having a length of 2048 bits.

In order to enable the task processing system to process a plurality of tasks in parallel, a segmentation operation needs to be performed on a computing resource according to an operating quantity of the tasks. The computing resource can include hardware apparatuses and storage space for task processing. Segmenting the computing resource can be splitting the computing resource so that each split computing resource can process tasks independently. A plurality of segmented computing resources can perform task processing in parallel or in series through a connected relationship.

Specifically, different types of RSA operation modules support different maximum bit widths. Meanwhile, different types of RSA operation modules include different numbers of segments and have different bit widths for each segment. Using an RSA operation module having a maximum bit width of RSA-4096 mode and supporting a maximum number of 8 segments as an example, the bit width of each segment is 512. If the tasks are one RSA-2048 task and two RSA-1024 tasks, four segments in RSA-4096 may be used for performing RSA-2048 operations, and two segments in RSA-4096 may be used for performing each of the RSA-1024 operations.

Referring again to FIG. 2, task processing system 200 also include an exponent shifter 220 that includes a plurality of shifters for segment exponents. Each segment, in turn, includes a corresponding number of shifters for segment exponents. Specifically, the plurality of shifters for segment exponents included in the exponent shifter correspond to the segments in the RSA hardware.

In the aforementioned solution, the maximum bit width of RSA-4096 mode that supports a maximum number of 8 segments and the tasks being one RSA-2048 task and two RSA-1024 tasks are used as an example. The segmentation result by the controller is that four segments in RSA-4096 are used for performing RSA-2048 operations, and four segments in RSA-4096 are used for performing two RSA-1024 operations.

The aforementioned RSA-4096 has two operands opA and opB with both having a length of 4096 bits. Setting the operands opA and opB according to the segmentation result may be dividing opA and opB into the 8 segments having a bit width of 512 bits. For example, segment 1 to segment 4 can be used for inputting operands of the task RSA-2048, while segment 5 to segment 6 can be used for inputting operands of the task RSA-1024, and segment 7 to segment 8 can be used for inputting operands of the other task RSA-1024

As a further example, the first 512 bit segment of the four RSA-2048 first segments is input as a first 512 bit operand of opA, the second 512 bit segment of the four RSA-2048 first segments is input as a second 512 bit operand of opA, the third 512 bit segment of the four RSA-2048 first segments is input as a third 512 bit operand of opA, the fourth 512 bit segment of the four RSA-2048 first segments is input as a fourth 512 bit operand of opA, the first 512 bit segment of the RSA-1024 second segments is input as a fifth 512 bit operand of opA, the second 512 bit segment of the RSA-1024 second segments is input as a sixth 512 bit operand of opA, the first 512 bit segment of the RSA-1024 third segments is input as a seventh 512 bit operand of opA, the second 512 bit segment of the RSA-1024 third segments is input as the eighth 512 bit operand of opA, for a total of 4096 bits.

It can be seen from the aforementioned embodiment that two or more tasks can be performed simultaneously in the data path when the RSA-2048 computing task is performed. If the time for completing one RSA-2048 computing task is T, the time required for N RSA-2048 computing tasks is N/2*T. In other words, since two RSA-2048 tasks can be performed during time T, each task can be considered to take time T/2. Thus, the efficiency is almost doubled as compared with the solution in the prior art.

In the aforementioned solution, a segmentation operation is performed in hardware. That is, a computing resource is segmented through an operating quantity of tasks to achieve parallel reconstruction of an operation module so that the operation module can dynamically configure corresponding computing resources according to tasks to support parallel processing of a plurality of computing tasks.

Further, the present application can utilize computing resources to its greatest extent for computing tasks requiring large computation such as short word length or hybrid word length. Accordingly, the technical problem that a task processing is performed based on different word lengths in the prior art which results in waste of computing resources is resolved.

The description below is provided by using the RSA operation module as the operation module. As an alternative embodiment, the aforementioned system further includes a multi-stage modular multiplier array that is formed by cascading a plurality of sub-modular multipliers. The multi-stage modular multiplier array performs modular multiplication on each task respectively using a corresponding sub-modular multiplier after the input operands are set according to the segmentation result. The operands are used for inputting data for modular multiplication to the multi-stage modular multiplier array. Setting operands according to a segmentation result can be segmenting the operands according to the segmentation result.

In the present application, the maximum bit width of a RSA-4096 mode (that supports a maximum number of 8 segments and the tasks being one RSA-2048 task and two RSA-1024 tasks) is used as an example. After operands are separately inputted to the 8 segments, 8 operand segments are respectively connected to corresponding sub-modular multipliers to serve as input values of the modular multipliers.

For example, the modular multiplier connected to the operands of segment 1 to segment 4 performs modular multiplication on operands of the task RSA-2048, while the modular multiplier connected to the operands of segment 5 to segment 6 performs modular multiplication on operands of the task RSA-1024, and the modular multiplier connected to operands of segment 7 to segment 8 performs modular multiplication on operands of the other task RSA-1024.

As an alternative embodiment, the aforementioned system further includes a register file that stores an intermediate result obtained through computation of each sub-modular multiplier. Specifically, the intermediate result is a result obtained by the sub-modular multiplier in the iterative process and is used for the next iterative operation. Meanwhile, the register file is also configured to store base numbers, exponents, and moduli in the tasks.

As an alternative embodiment, the aforementioned controller is further configured to determine a total number of shifters for segment exponents according to a maximum bit width of the hardware and a minimum bit width of each segment. As an alternative embodiment, the aforementioned controller is further configured to perform segmentation on the plurality of shifters for segment exponents based on the operating quantity of the tasks and a bit width of each task. The segmentation result refers to segments allocated to each task, and each segment includes a corresponding number of shifters for segment exponents.

As an alternative embodiment, in the aforementioned task processing system, correction gating controls between any two adjacent segments are in an OFF state, and correction gating controls between shifters for segment exponents included within each segment are in an ON state and have linear displacement. As an alternative embodiment, the aforementioned controller is further configured to control, through a first correction gating control signal of the controller, whether to perform cross-segment shifting between any two adjacent segments.

As an alternative embodiment, the aforementioned controller is further configured to segment the input operands according to the segments allocated to each task, and segment outputs of the input operands are connected to corresponding sub-modular multipliers after the input operands are set according to the segmentation result.

As an alternative embodiment, the aforementioned controller is further configured to segment the multi-stage modular multiplier array according to the segments allocated to each task. The controller is also configured to determine segmenting sub-modular multipliers corresponding to each task, and respectively perform modular multiplication using the segmenting sub-modular multipliers corresponding to each task.

As an alternative embodiment, in the aforementioned task processing system, correction gating controls between any two adjacent segmenting sub-modular multipliers are in an OFF state. Correction gating controls between sub-modular multipliers included within each segmenting sub-modular multiplier are in an ON state, and a carry result of a low-byte sub-modular multiplier is transferred to a high-byte sub-modular multiplier for offset correction. As an alternative embodiment, the aforementioned controller is further configured to control, through a second correction gating control signal of the controller, any segmenting sub-modular multiplier to use a previous-stage modular multiplication carry term as a next-stage modular multiplication offset term.

Figure 3:
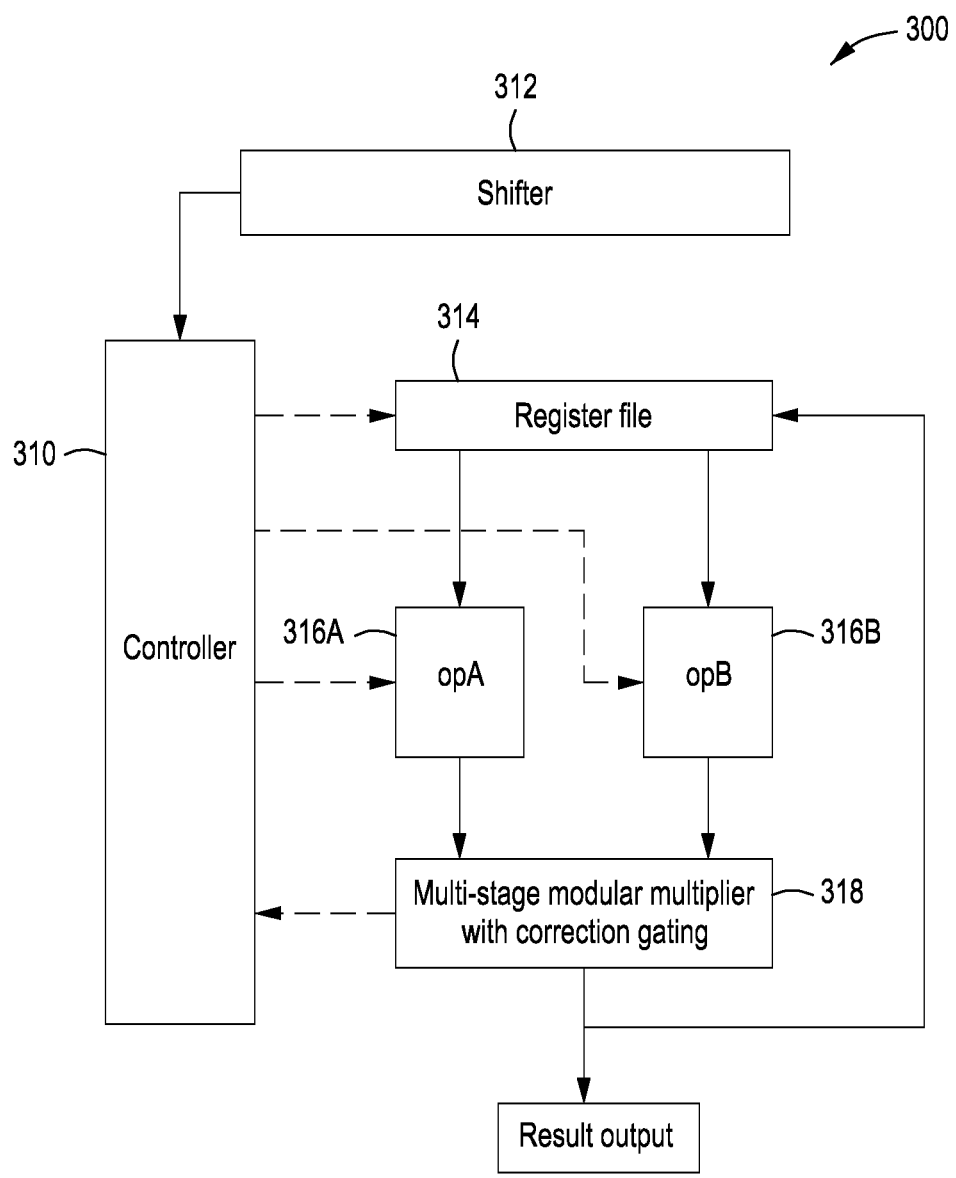
FIG. 3 is a block diagram illustrating an example of an RSA operation module 300 in accordance with the present application.

FIG. 3 shows a block diagram that illustrates an example of an RSA operation module 300 in accordance with the present application. As shown in FIG. 3, RSA operation module 300 includes a controller 310 that generates the correct control sequence in the iterative process of the whole modular exponentiation, and a segment exponent shifter 312. Segment exponent shifter 312 is evenly divided into several segments, and linear shifting exists within each segment. Whether to perform cross-segment shifting between two adjacent segments is decided according to a correction gating signal of the controller.

Module 300 further includes a register file 314 that stores base numbers, exponents, moduli, and other intermediate results in computing tasks. In addition, module 300 includes a segmentable operand opA register 316A and a segmentable operand opB register 316B that gates two input factors, and a multi-stage modular multiplier array 318 that has correction gating formed by cascading a plurality of small modular multipliers. Each small modular multiplier can perform modular multiplication corresponding to the supported minimum segment length. After each factor is segmented, each segment output is connected to a corresponding multi-stage modular multiplier.

When it is necessary to perform modular multiplication of a segment length greater than the minimum segment length, corresponding modular multipliers need to be cascaded. In each step of segmented modular multiplication, a previous-stage modular multiplication carry term needs to be used as a next-stage modular multiplication offset term (namely, correction term), which is controlled by the correction gating signal of the controller. (The modulus of the modular multiplier is also from the register file, which is not marked in the figure, and segmentation is performed in a similar manner.)

Figure 4:
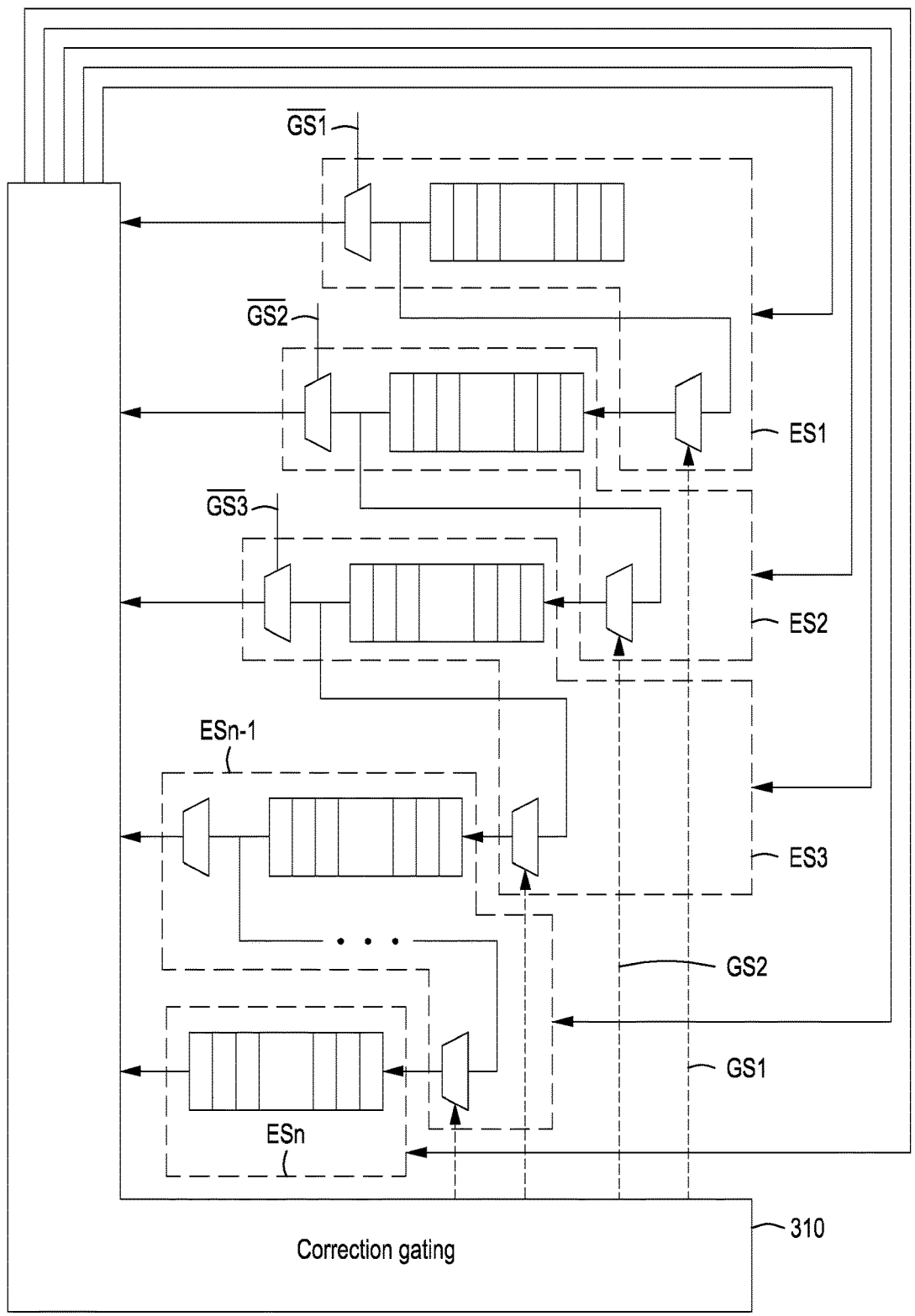
FIG. 4 is a block diagram illustrating an example of segment exponent shifter 312 in accordance with the present application.

FIG. 4 shows a block diagram that illustrates an example of segment exponent shifter 312 in accordance with the present application. As shown in FIG. 4, exponent shifter 312 includes n unit exponent shifters ES1-ESn. Except for the last exponent shifter ESn, the exponent shifters ES1-ESn-1 include a next shifter gate 320 and a controller gate 322 that respond to a corresponding gating signal GS of a plurality of gating signals GS1-GSn-1. In operation, a first logic state of a gating signal GS passes the output value through the next shifter gate 320, while a second logic state of the gating signal GS passes the output value through the controller gate 322.

The correction gating signal GS is used for indicating whether to perform cross-segment shifting. The correction gating signal GS is generated by controller 310 according to computing tasks allocated thereto. The correction gating signal GS can be sent to each unit exponent shifter ES according to the computing tasks to indicate the connection state of each shifter ES.

Thus, in the present example, eight 512-bit shift registers are coupled in series, where seven of the 512-bit shift registers are gated such that an output value of a 512-bit shift register can be directed to a next-register output or a controller output in response to a gating signal GS. The next-register output is coupled to a next 512-bit shift register in the series, while the controller output is connected to controller 310.

Figure 5:
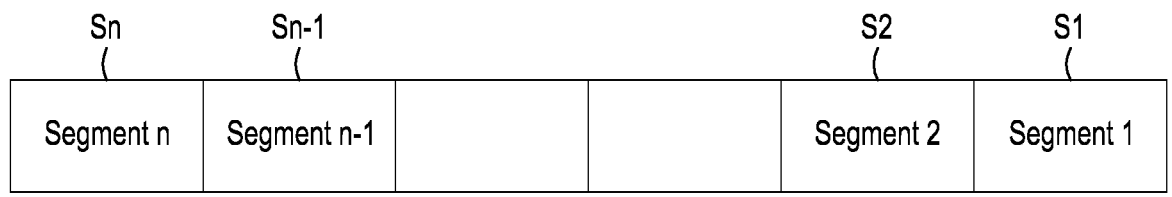
FIG. 5 is a diagram illustrating an example of the segmentation of an operand opA register 316A and operand opB register 316B in accordance with the present application.

FIG. 5 shows a diagram that illustrates an example of the segmentation of an operand opA register 316A and operand opB register 316B in accordance with the present application. As shown in FIG. 5, the operand opA and opB registers 316A and 316B are both divided into n segments S1-Sn. In the present example, the operand opA register 316A and the operand opB register 316B are divided into eight 512 bit segments. In addition, segments to be connected to the multi-stage modular multiplier array are controlled through a correction gating signal of the controller.

Figure 6:
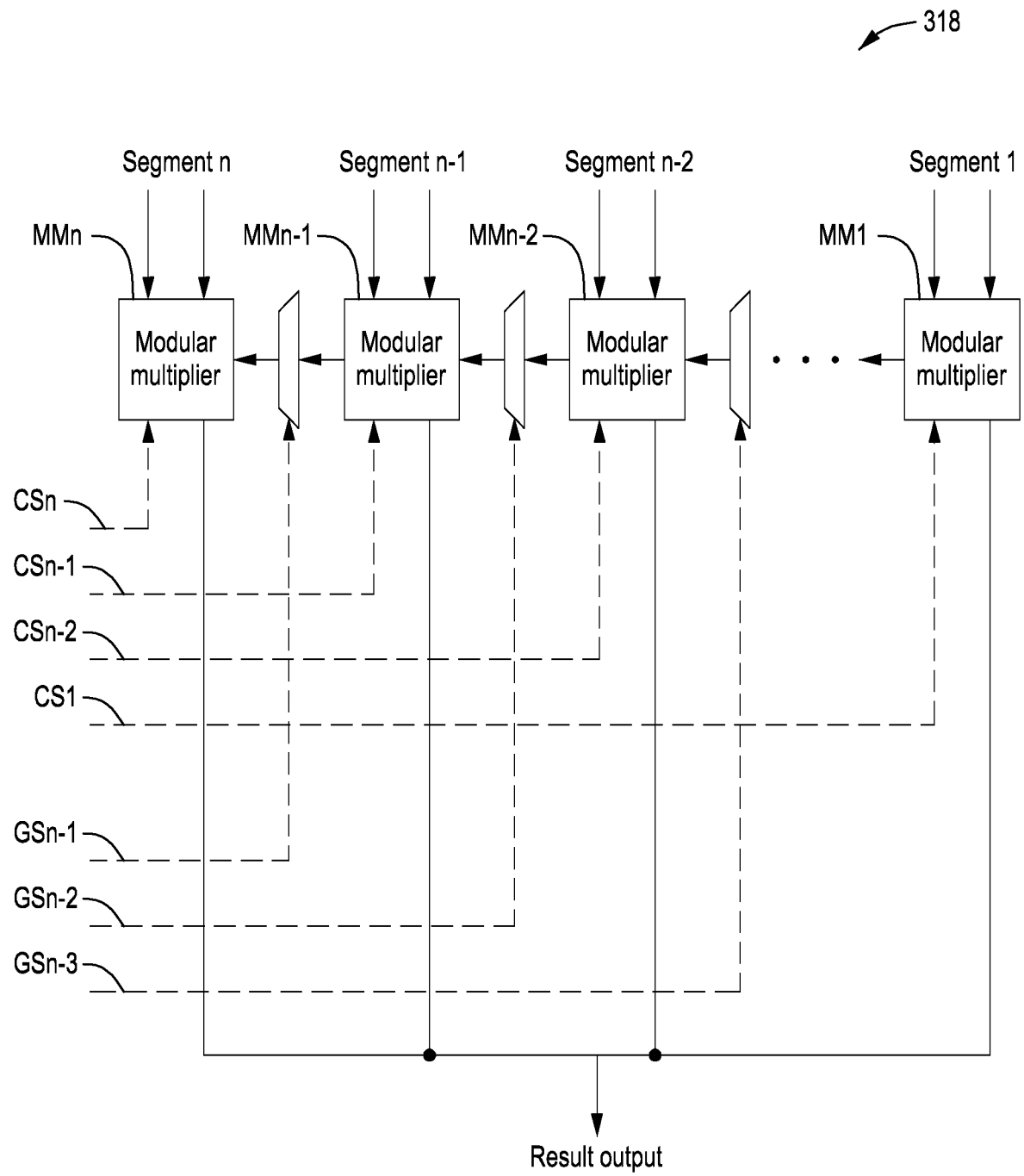
FIG. 6 is a schematic diagram illustrating an example of multi-stage modular multiplier array 318 in accordance with the present application.

FIG. 6 is a schematic diagram illustrating an example of multi-stage modular multiplier array 318 in accordance with the present application. As shown in FIG. 6, multi-stage modular multiplier array 318 includes n modular multipliers MM1-MMn. Each modular multiplier MM receives a corresponding segment of opA or opB as an operand of the modular multiplier, and receives a control signal CS1-CSn sent by the controller.

Thus, in the present example, eight modular multipliers MM1-MM8 are coupled to eight 512-bit operand segments S1-S8 in the first and second 4096 bit operand opA register 316A and operand opB register 316B such that each modular multiplier MM is coupled to a 512-bit operand segment S in the first operand opA register 316A and a corresponding 512-bit operand segment S in the second operand opB register 316B.

Modular multipliers MM are coupled to each other through the correction gating signals GS1-GSn-1. When the correction gating signal GS1-GSn-1 between a previous-stage modular multiplier MM and a next-stage modular multiplier MM is turned on to pass the output value through the next shifter gate 320, a carry term of the previous-stage modular multiplier MM is used as a correction term of the next-stage modular multiplier MM to implement cascading of operations.

Specifically, the controller determines a correction gating signal GS between modular multipliers according to an operation length of tasks. When the operation length of tasks is less than a maximum operation length supported by one modular multiplier, one modular multiplier may be used for modular multiplication without modular multipliers being cascaded.

When the operation length of tasks is greater than a maximum operation length supported by one modular multiplier and less than a maximum operation length supported by two modular multipliers, two modular multipliers may be cascaded. That is, the two modular multipliers are cascaded through a correction gating signal between the two modular multipliers so that a carry term of the previous-stage modular multiplier can be used as a correction term of the next-stage modular multiplier during operation.

The controller performs the corresponding segmentation operation according to the size of the computing tasks allocated thereto, and controls corresponding correction gating units according to the segmentation situation. For each segment, the controller sets the input operands opA and opB of a modular multiplication unit of this segment according to the data state of the corresponding exponent shifter, accomplishes a series of modular multiplication operations by means of iteration, and updates the result of each operation.

For example, a method of dynamic reconstruction of RSA, where the hardware supports a maximum bit width of RSA-4096 mode and a maximum number of 8 segments (the minimum bit width of each segment is 4096/8=512) and performs parallel computation of one RSA-2048 task and two RSA-1024 tasks, begins by marking the smallest segments as S1-S8 in sequence. In this step, the smallest segment is a shifter for unit segment exponents, and is also the smallest segment of opA and opB. Similarly, if a shifter for segment exponents is divided into eight segments S1-S8, such that multi-state modular multiplier array 318 also includes eight modular multipliers.

Next, the controller performs dynamic segmentation again according to computing tasks allocated thereto. New dynamic segments are marked as U1(S1-S4), U2(S5-S6), and U3(S7-S8), where the RSA-2048 computing task is allocated to U1, and the other two RSA-1024 computing tasks are allocated to U2 and U3.

In the aforementioned step, since one RSA-2048 task and two RSA-1024 tasks need to be executed in parallel, and each segment can execute a task having a length of 512 bits, each segment can be divided into three parts used for respectively executing one RSA-2048 task and two RSA-1024 tasks. One RSA-2048 task needs to be executed by four segments, while each of the two RSA-1024 tasks needs to be executed by two segments, which give rise to the aforementioned grouping.

Following this, the controller configures the shifters for segment exponents in the distribution format corresponding to U1, U2, and U3: the correction gating controls between S1-S4, between S5 and S6, and between S7 and S8 are turned on. The shift register therefore performs continuous shifting within the three segments. Moreover, the correction gating controls between S4 and S5 and between S6 and S7 are turned off to ensure that the three segments do not affect one another. A schematic diagram of the shifter for segment exponents is shown in FIG. 4.

After obtaining the result of dynamic segmentation, the controller controls a correction gating signal to perform segmentation according to the result of the dynamic segmentation. Because S1 to S4 form one segment, S5 to S6 form one segment, and S7 to S8 form one segment, the controller can control to turn on correction gating controls between S1 and S2, S2 and S3, S3 and S4, S5 and S6, and between S7 and S8, and turn off correction gating controls between S4 and S5 and between S6 and S7.

Following this is operand segmentation. The initial operand opA register 316A and operand opB register 316B are both 4096 bits (corresponding to RSA-4096), and are divided into three segments of 2048 bits, 1024 bits, and 1024 bits according to the segments U1, U2, and U3. The operands are segmented to enable parallel execution of one RSA-2048 task and two RSA-1024 tasks as discussed with respect to FIG. 5.

Next is multi-stage modular multiplier segmentation. The 8 modular multipliers are divided into three parts in sequence: 4 modular multipliers, 2 modular multipliers, and 2 modular multipliers, which respectively correspond to the segments U1, U2, and U3. Within each segment, the correction gating controls between unit modular multipliers are turned on, and a low-byte carry result is transferred to a high-byte modular multiplier for offset correction.

That is, various unit modular multipliers within each segment are combined into a "segmental modular multiplier" capable of processing the corresponding segment size. The corresponding correction gating controls between different segments are turned off, so that the segmental modular multipliers do not affect one another. A schematic diagram of a multi-stage modular multiplier array with correction gating controls is shown in FIG. 6.

Figure 7:
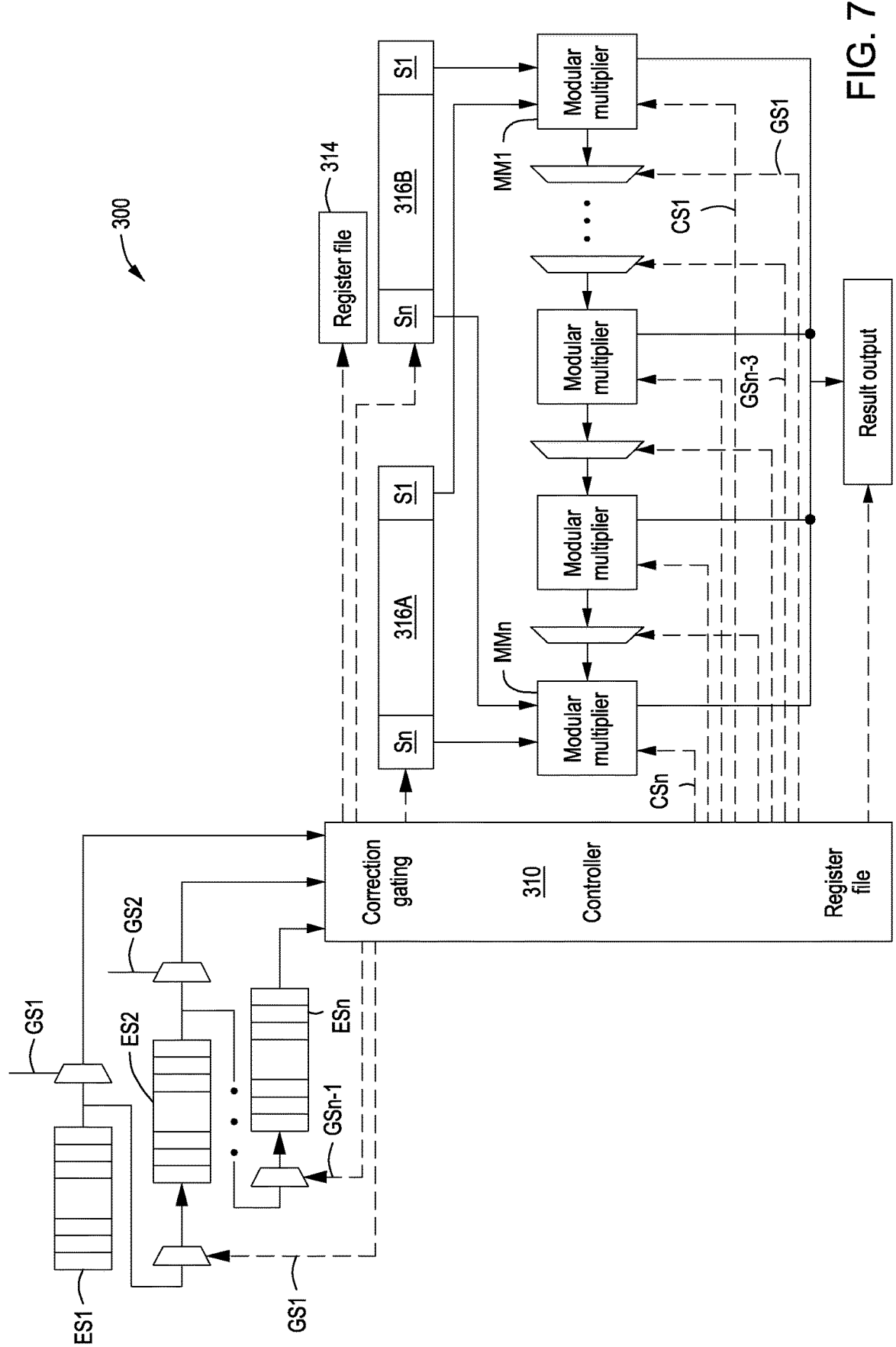
FIG. 7 is a schematic diagram further illustrating an example of RSA operation module 300 in accordance with the present application.

FIG. 7 is a schematic diagram further illustrating an example of RSA operation module 300 in accordance with the present application. As shown in FIG. 7, exponent shifter 312 (as shown in FIG. 4) includes n unit exponent shifters ES1-ESn. Correction gating controls are included between the n unit exponent shifters ES1-ESn. The n unit exponent shifters ES1-ESn are segmented according to tasks. The correction gating signals GS for the exponent shifters ES in the same segment are turned on, while the correction gating signals GS for exponent shifters ES in different segments are turned off. The correction gating signals GS1-GSn-1 are output by controller 310.

The operand opA register 316A and operand opB register 316B (shown in connection with FIG. 5) are divided into n segments S1-Sn. Each segment of operand opA register 316A and operand opB register 316B is connected to a corresponding sub-modular multiplier MM. The sub-modular multipliers MM (shown in connection with FIG. 6) are also segmented according to tasks. The correction gating signals GS between adjacent sub-modular multipliers MM belonging to the same segmental modular multiplier are turned on, while the correction gating signals GS between adjacent sub-modular multipliers MM belonging to different segmental modular multipliers MM are turned off. The correction gating signals GS1-GSn are output by controller 310.

Figure 8:
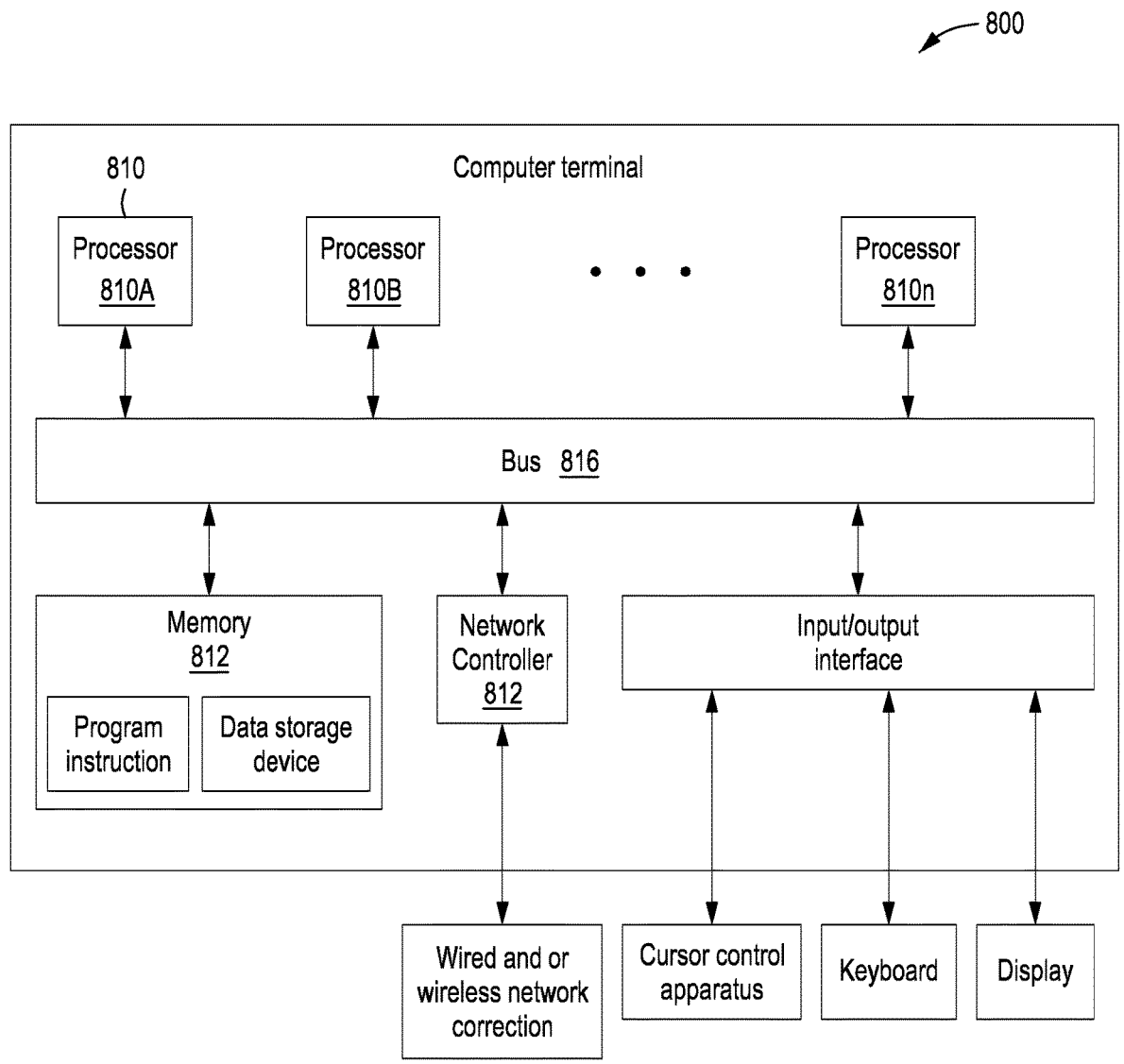
FIG. 8 is a block diagram illustrating an example of a computer terminal 800 that implements a task processing method in accordance with the present application.

FIG. 8 is a block diagram illustrating an example of a computer terminal 800 (or mobile apparatus) that implements a task processing method in accordance with the present application. As shown in FIG. 8, computer terminal 800 (or mobile apparatus 800) includes one or more processors 810 (shown as 810A, 810B, . . . , 810n in the figure) (processor 810 can include, but is not limited to, a processing device such as a microprocessor (MCU) or a programmable logic device (FPGA)). Computer terminal 800 also includes a memory 812 to store data, a network controller 814 to implement a communication function, and a bus 816 that couples processor 810, memory 812, and network controller 814 together.

In addition, computer terminal 800 can also include a display, an input/output interface (I/O interface), a universal serial bus (USB) port (which may be included as one of the ports for the I/O interface), a network interface, a power supply, and/or a camera. Those of ordinary skill in the art can understand that the structure shown in FIG. 8 is merely exemplary and does not limit the structure of the aforementioned electronic device. For example, the computer terminal 800 can also include more or fewer components than those shown in FIG. 8, or have a different configuration from that shown in FIG. 8.

The one or more processors 810 described above and/or other data processing circuits may generally be referred to herein as "data processing circuits." The data processing circuit may be embodied in whole or in part as software, hardware, firmware, or any other combination. In addition, the data processing circuit may be a single, independent processing module, or may be combined in whole or in part into any of the other elements in the computer terminal 800 (or mobile apparatus 800). As involved in this embodiment of the present application, the data processing circuit is used as a processor for controlling (e.g., controlling for a selection of a variable resistance terminal path connected to an interface).

The memory 812 can be configured to store software programs and modules of an application software, such as program instructions/data storage apparatuses corresponding to the task processing method in this embodiment of the present application. Processor 810 executes the software programs and modules stored in memory 812 so as to execute various functional applications and data processing, i.e., implementing the above task processing method.

Memory 812 can include a high-speed random access memory, and can also include a non-volatile memory such as one or more magnetic storage devices, flash memory, or other non-volatile solid-state memories. In some examples, memory 812 can further include memories arranged remotely with respect to the processor 810. The remote memories may be connected to computer terminal 800 via a network. Examples of such networks include, but are not limited to, the Internet, intranets, local area networks, mobile communication networks, and the combinations thereof.

Network controller 814 is configured to receive or send data via a network. The above specific example of the network can include a wireless network provided by a communication provider of the computer terminal 800. In one example, network controller 814 includes a network interface controller (NIC) that can be connected to other network apparatuses through a base station so that it can communicate with the Internet. In one example, network controller 814 can include a radio frequency (RF) module for wirelessly communicating with the Internet.

The display can be, for example, a touch-screen liquid crystal display (LCD), and the liquid crystal display can enable a user to interact with a user interface of the computer terminal 800 (or mobile apparatus 800). In some alternative embodiments, the computer apparatus 800 (or mobile apparatus 800) shown in FIG. 8 above can include hardware elements (including circuits), software elements (including computer code stored on a computer-readable medium), or a combination of hardware elements and software elements. It should be noted that FIG. 8 is merely one specific concrete example, and is intended to show the types of components that may exist in the above computer apparatus (or mobile apparatus).

In operation, processor 810 receives a first task having y bits (e.g., 2048 bits) and a second task having z bits (e.g., 1024 bits), and divides the y-bit first task into a first plurality of x-bit (e.g., 512 bit) segments, and the z-bit second task into a second plurality of x-bit segments. The processor also loads the first plurality of x-bit segments into a first group of shift registers of a plurality of x-bit shift registers such that each x-bit segment of the first plurality of x-bit segments is loaded into a corresponding x-bit shift register in the first group of shift registers. The processor also loads the second plurality of x-bit segments into a second group of shift registers of the plurality of x-bit shift registers such that each x-bit segment of the second plurality of x-bit segments is loaded into a corresponding x-bit shift register in the second group of shift registers.

In addition, processor 810 sets a first number of gating signals such that the first group of shift registers are serially connected and only a last shift register of the first group of shift registers is output to the controller, and a second number of gating signals such that the second group of shift registers are serially connected and only a last shift register of the second group of shift registers is output to the controller.

Further, processor 810 shifts the first plurality of x-bit segments in the first group of shift registers, and the second plurality of x-bit segments in the second group of shift registers, and loads the output of the last shift register from the first group of shift registers into first and second operand registers, and the output of the last shift register from the second group of shift registers into the first and second operand registers. Processor 810 also outputs a control signal to the plurality of modular multipliers such that each modular multiplier multiplies a x-bit segment from the first operand register with a corresponding x-bit segment from the second operand register.

The steps described can be performed in a computer system such as a set of computer-executable instructions. Although a logical order is shown, in some cases, the described steps can be performed in a different order other than the one described here. The steps can be executed in a mobile terminal, a computer terminal, or a similar computing device.

Figure 9A:
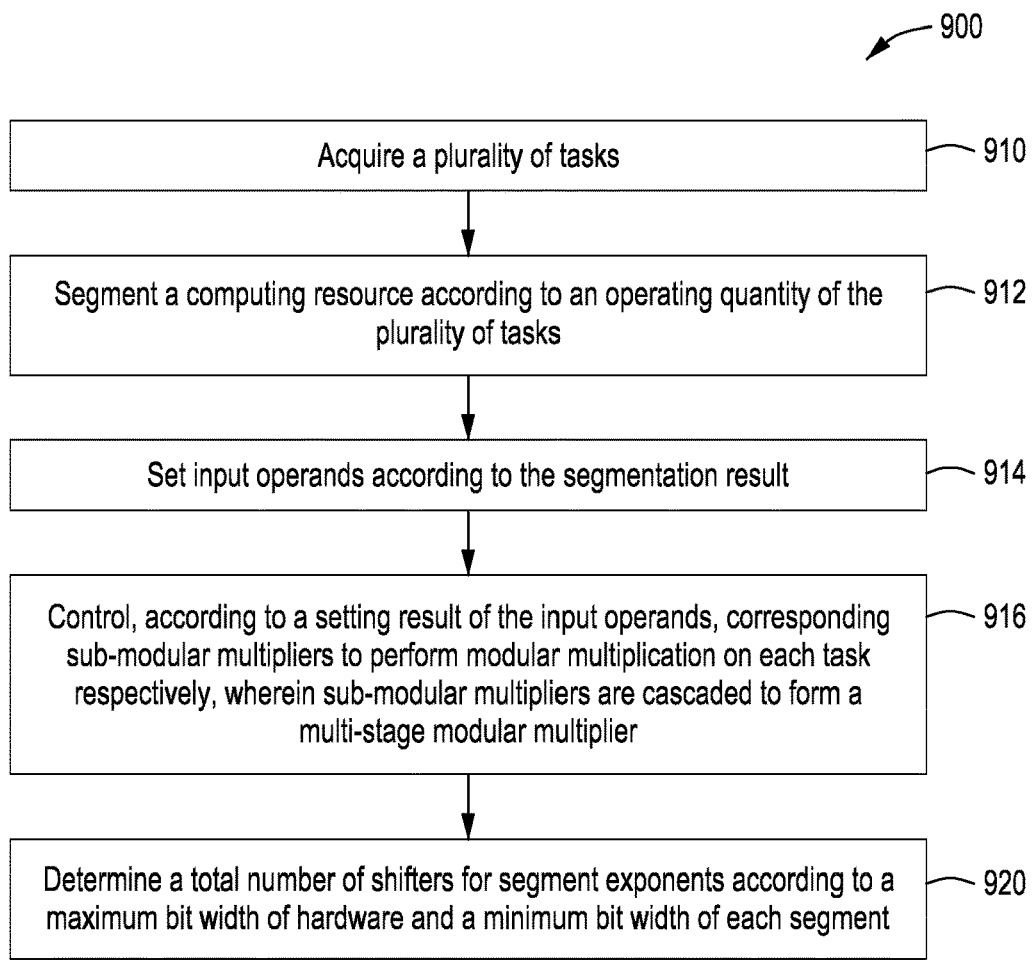
FIGS. 9A and 9B are flowcharts illustrating examples of task processing methods in accordance with the present application.
Figure 9B:
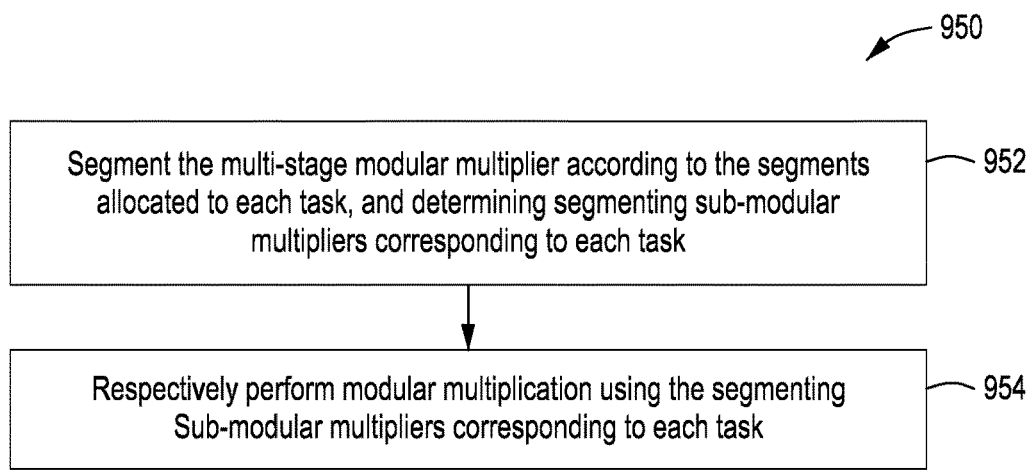

FIGS. 9A and 9B show flowcharts that illustrate examples of task processing methods in accordance with the present application. FIG. 9A shows a flowchart that illustrates an example of a task processing method 900, while FIG. 9B shows a flowchart that illustrates an example of a method 950 that implements step 916 of method 900. Methods 900 and 950 can be implemented on computer apparatus 800.

As shown in FIG. 9A, method 900 begins at 910 by acquiring a plurality of tasks. Specifically, the tasks can be modular multiplication tasks in an RSA encryption operation. A key having a fixed length for use by an asymmetric encryption algorithm is obtained through modular multiplication in the RSA encryption operation. For example, if the task is RSA-2048, the task of the RSA operation module is to generate a key having a length of 2048 bits.

Following this, method 900 moves to 912 to segment a computing resource according to an operating quantity of the plurality of tasks. The computing resource can be an exponent shifter of the RSA operation module. The segmentation result can be matching one or more exponent shifters for a task.

Next, method 900 moves to 914 to set input operands according to the segmentation result. The operands are used for inputting data for modular multiplication to the multi-stage modular multiplier array. Setting operands according to a segmentation result can be segmenting the operands according to the segmentation result. The maximum bit width of RSA-4096 mode that supports a maximum number of 8 segments and the tasks being one RSA-2048 task and two RSA-1024 tasks are used as an example.

The aforementioned RSA-4096 has an operand opA register 316A and an operand opB register 316B with both having a length of 4096 bits. A segmentation result of segmenting an exponent shifter by the controller is that four segments in RSA-4096 are used for performing RSA-2048 operations, and four segments in RSA-4096 are used for performing two RSA-1024 operations. Setting the operands opA in register 316A and opB in register 316B according to the segmentation result may be dividing opA and opB into three segments having lengths of 2048 bits, 1024 bits, and 1024 bits respectively. OpA and opB having a length of 2048 bits are used for performing RSA-2048 operations, while two opA and opB having a length of 1024 bits are respectively used for performing operations of two RSA-1024. The operations are modular multiplication.

It can be seen from the aforementioned example that three tasks can be performed simultaneously in the data path when the RSA-2048 computing task is performed along with two RSA-1024 tasks. If the time for completing one RSA-2048 computing task is T, the time required for N RSA-2048 computing tasks is N/2*T, thus the efficiency is almost doubled as compared with the solution in the prior art.

In the aforementioned solution, a segmentation operation is performed in hardware. That is, a computing resource is segmented through an operating quantity of tasks to achieve parallel reconstruction of an operation module so that the operation module can dynamically configure corresponding computing resources according to tasks to support parallel processing of a plurality of computing tasks.

Further, the present application can utilize computing resources to its greatest extent for computing tasks requiring large computation such as short word length or hybrid word length. Accordingly, the technical problem that a task processing is performed based on different word lengths in the prior art which results in waste of computing resources is resolved.

Referring again to FIG. 9A, method 900 can optionally move from 914 to 916 to control, according to a setting result of the input operands, corresponding sub-modular multipliers to perform modular multiplication on each task respectively, wherein sub-modular multipliers are cascaded to form a multi-stage modular multiplier.

In the aforementioned step, the RSA operation module includes a plurality of sub-modular multipliers. Still using an RSA-4096 operation module as an example, the RSA-4096 operation module includes 8 sub-modular multipliers, and each modular multiplier can perform modular multiplication with an operand of 512. In order to perform one RSA-2048 task and two RSA-1024 tasks in parallel, four sub-modular multipliers may be cascaded to form one multi-stage modular multiplier for performing modular multiplication on operands of the task RSA-2048. The remaining four sub-modular multipliers may be cascaded in pairs to obtain two multi-stage modular multipliers for respectively performing modular multiplication on operands of the two tasks RSA-1024.

As an alternative embodiment, referring again to FIG. 9A, method 900 can begin at 920 by determining a total number of shifters for segment exponents according to a maximum bit width of hardware and a minimum bit width of each segment, and then moves to 910. In the aforementioned step, the hardware can be an RSA operation module, the maximum bit width of the RSA operation module can be the length of the task to be executed by the RSA operation module at a time, and the minimum bit width of each segment can be the length of the task to be executed by each shifter for segment exponents.

In an alternative embodiment, using an RSA-4096 computing module as an example, the maximum bit width supported is 4096 bits, and the minimum bit width of each segment is 512 bits. Therefore, the total number of shifters for segment exponents of the RSA operation module, namely, the number of unit shifters for segment exponents included in the RSA operation module is 8.

As an alternative embodiment, segmentation is performed on the plurality of shifters for segment exponents based on the operating quantity of the tasks and a bit width of each task. The segmentation result refers to segments allocated to each task, and each segment includes a corresponding number of shifters for segment exponents. In the aforementioned step, each segment includes a corresponding number of shifters for segment exponents, wherein the corresponding number refers to a number corresponding to the task length. The ratio of the task length to the bit width of each shifter for segment exponents is the number of shifters for segment exponents corresponding to the task.

In order to enable the task processing system to process a plurality of tasks in parallel, a segmentation operation needs to be performed according to an operating quantity of the tasks. Specifically, different types of RSA operation modules support different maximum bit widths. Meanwhile, different types of RSA operation modules include different numbers of segments and have different bit widths for each segment.

Still using the RSA operation module having a maximum bit width of RSA-4096 mode and supporting a maximum number of 8 segments as an example, the bit width supported by each shifter for segment exponents is 512. If the tasks are one RSA-2048 task and two RSA-1024 tasks, four segments in RSA-4096 can be used for performing RSA-2048 operations, and two segments in RSA-4096 can be used for performing RSA-1024 operations.

Specifically, the 8 segments of the RSA operation module are respectively shown as S1 to S8. The segmentation result of the one RSA-2048 task and the two RSA-1024 tasks are respectively shown with U1, U2, and U3. As a result, the segmentation result is that U1 corresponds to S1 to S4, U2 corresponds to S5 to S6, and U3 corresponds to S7 to S8. That is, the RSA-2048 computing task is allocated to U1, and the other two RSA-1024 computing tasks are allocated to U2 and U3.

As an alternative embodiment, correction gating controls between any two adjacent segments are in an OFF state, and correction gating controls between shifters for segment exponents included within each segment are in an ON state and have linear displacement.

In an alternative embodiment, referring back to shifter 312 shown in FIG. 4, (still using the RSA operation module in RSA-4096 mode that supports a maximum number of 8 segments executing one RSA-2048 task and two RSA-1024 tasks in parallel as an example), because shifters ES1 to ES4 in U1 are allocated to the task RSA-2048, and the bit width of each shifter ES for segment exponents in ES1 to ES4 is 512 bits, ES1 to ES4 must be cascaded to execute the task RSA-2048.

That is, the correction gating control between shifters ES1-ES4 is in an ON state, which is equivalent to that four shifters for segment exponents of 512 bits constitute one shifter for segment exponents of 2048 bits through cascading of the correction gating signals. Similarly, the correction gating control between shifters ES5 and ES6 in U2 is also in an ON state, and the correction gating control between shifters ES7 and ES8 in U3 is also in an ON state, which are respectively used for executing the two RSA-1024 tasks.

However, since U1, U2, and U3 run in parallel, the correction gating controls between U1, U2, and U3 are in an OFF state. That is, the correction gating control between shifters ES4 and ES5 is in an OFF state, and the correction gating control between shifters ES6 and ES7 is in an OFF state.

As an alternative embodiment, whether to perform cross-segment shifting between any two adjacent segments is controlled through a first correction gating control signal of the controller. Specifically, shifters for segment exponents belonging to different segments are configured to execute different tasks in parallel. Therefore, the correction gating control between two adjacent shifters for segment exponents belonging to different segments are in an OFF state.

However, correction gating control between any two adjacent shifters for segment exponents in one segment is in an ON state. That is, a plurality of shifters for segment exponents in one segment are configured to jointly execute the same task. When the task needs to be jointly executed by the plurality of shifters for segment exponents in the segment, the first correction gating signal controls whether to perform cross-segment shifting between two adjacent shifters for segment exponents.

As an alternative embodiment, the setting input operands according to a segmentation result includes: segmenting the input operands according to the segments allocated to each task, and segment outputs of the input operands are connected to corresponding sub-modular multipliers after the input operands are set according to the segmentation result.

In the aforementioned step, segmenting the input operands according to the segments allocated to each task is segmenting the operands according to the segmentation result. First, the operand is segmented according to the bit width of the shifter for segment exponents to obtain segment S1 to segment Sn shown in FIG. 5. Each of segment S1 to segment Sn has the same bit width as the shifter for segment exponents, and the segmented operands are respectively connected to the corresponding sub-modular multipliers.

The operands are used for inputting data for modular multiplication to the multi-stage modular multiplier. Setting operands according to a segmentation result can be segmenting the operands according to the segmentation result. In an alternative embodiment, still using the maximum bit width of RSA-4096 mode that supports a maximum number of 8 segments and the tasks being one RSA-2048 task and two RSA-1024 tasks as an example, RSA-4096 has two operands opA and opB with both having a length of 4096 bits.

The segmentation result from the controller is that four segments in RSA-4096 are used for performing RSA-2048 operations, and two segments in RSA-4096 are used for performing RSA-1024 operations. Setting the operands opA and opB according to the segmentation result can be dividing opA and opB into 8 segments having a bit width of 512 bits.

Segment S1 to segment S4 are used for inputting operands of the task RSA-2048, while segment S5 to segment S6 are used for inputting operands of the task RSA-1024, and segment S7 to segment S8 are used for inputting operands of the other task RSA-1024. Eight operands are then respectively connected to corresponding sub-modular multipliers to serve as input values of the modular multiplier.

FIG. 9B shows a flow chart illustrating an example of a method 950 that implements step 916 in accordance with the present application. As shown in FIG. 9B, method 950 begins at 952 by segmenting the multi-stage modular multiplier according to the segments allocated to each task, and determining segmenting sub-modular multipliers corresponding to each task.

In the aforementioned step, the multi-stage modular multiplier of the RSA operation module includes a plurality of sub-modular multipliers. The segmenting the multi-stage modular multiplier according to the segments allocated to each task is determining one or more sub-modular multipliers corresponding to each task. If the segmenting sub-modular multiplier corresponding to the task includes a plurality of sub-modular multipliers, the plurality of sub-modular multipliers in the segmenting sub-modular multiplier are cascaded.

Next, method 950 moves to 954 to respectively perform modular multiplication using the segmenting sub-modular multipliers corresponding to each task. In an alternative embodiment, the segmentation of the multi-stage modular multiplier is described still using the maximum bit width of RSA-4096 mode that supports a maximum number of 8 segments and the tasks being one RSA-2048 task and two RSA-1024 tasks as an example.

In this embodiment, segment S1 to segment S4 are used for inputting operands of the task RSA-2048, while segment S5 to segment S6 are used for inputting operands of the task RSA-1024, and segment S7 to segment S8 are used for inputting operands of the other task RSA-1024. Eight operands are then respectively connected to corresponding sub-modular multipliers to serve as input values of the modular multiplier.

Moreover, the sub-modular multipliers connected to the operand segments S1 to S4 constitute one segmenting sub-modular multiplier configured to perform operation on operands of the task RSA-2048, while the sub-modular multipliers connected to the operand segments S5 to S6 constitute one segmenting sub-modular multiplier configured to perform operation on operands of one task RSA-1024, and the sub-modular multipliers connected to the operand segments S7 to S8 constitute one segmenting sub-modular multiplier configured to perform operation on operands of the other task RSA-1024.

As an alternative embodiment, correction gating controls between any two adjacent segmenting sub-modular multipliers are in an OFF state, while correction gating controls between sub-modular multipliers included within each segmenting sub-modular multiplier are in an ON state. The carry result of a low-byte sub-modular multiplier is transferred to a high-byte sub-modular multiplier for offset correction.

When the correction gating controls between sub-modular multipliers are turned on, a low-byte carry result is transferred to a high-byte modular multiplier for offset correction.

That is, a plurality of sub-modular multipliers within each segment are combined into a segmental modular multiplier capable of processing the corresponding task. The adjacent correction gating controls between different segments are turned off. That is, the segmental modular multipliers can execute tasks in parallel without affecting each other.

In an alternative embodiment, with reference to FIG. 6, a correction gating control signal exists in every two adjacent sub-modular multipliers. When correction gating control signals between a plurality of sub-modular multipliers are in an ON state, a low-byte sub-modular multiplier can send an offset term to a high-byte sub-modular multiplier. The plurality of sub-modular multipliers constitute a segmental modular multiplier configured to process one task. When correction gating control signals between a plurality of sub-modular multipliers are in an OFF state, the plurality of sub-modular multipliers are respectively configured to process different tasks.

Still using the maximum bit width of RSA-4096 mode that supports a maximum number of 8 segments and the tasks being one RSA-2048 task and two RSA-1024 tasks as an example, the correction gating controls between the sub-modular multipliers connected to the operand segments S1 to S4 are in an ON state, while the correction gating controls between the sub-modular multipliers connected to the operand segments S5 to S6 are in an ON state, and the correction gating controls between the sub-modular multipliers connected to the operand segments S7 to S8 are in an ON state. The correction gating controls between the segmental modular multipliers are in an OFF state.

As an alternative embodiment, any segmenting sub-modular multiplier is controlled, through a second correction gating control signal of the controller, to use a previous-stage modular multiplication carry term as a next-stage modular multiplication offset term. Specifically, in any segmental modular multiplier, a previous-stage modular multiplication carry term is a carry term generated by a low-byte sub-modular multiplier in the segmental modular multiplier.

The carry term will serve as a next-stage modular multiplication offset term which is an offset term of a high-byte sub-modular multiplier in the segmental modular multiplier. In other words, the high-byte sub-modular multiplier acquires, through a second correction gating control signal, the modular multiplication carry term generated by the low-byte sub-modular multiplier to serve as its modular multiplication offset term.

In the aforementioned step, since a plurality of sub-modular multipliers included in one segmental modular multiplier need to execute one modular multiplication task at the same time, the plurality of sub-modular multipliers having the same bit width are required to execute modular multiplication of different bits. Moreover, since a low-order bit needs to perform a carry to a high-order bit in modular multiplication, a low-byte sub-modular multiplier is required to generate a carry term as an offset term for a high-byte sub-modular multiplier. Further, after the output result of each segmental modular multiplier is obtained, it is also necessary to splice the output result of each segmental modular multiplier to obtain the final result.

In the aforementioned solution, a correction control module is added to enable dynamic configuration of the data path according to the word length of the task distributed each time, so that multi-task parallel processing is implemented without additionally configuring storage space. Further, an operation such as high-order zero-padding can be skipped for a computing task in a short word length RSA mode. The solution not only achieves very high resource utilization in both space and time dimensions, but it also ensures high throughput. In the case of intensive distribution of computing tasks of various word length modes, resource utilization efficiency of almost 100% can be achieved.

In order to briefly describe each foregoing method embodiment, all the method embodiments are expressed as a combination of a series of actions, but those skilled in the art should know that the present application is not limited by the sequence of the described actions. Certain steps can be applied with different sequences or can be carried out at the same time according to the present application. Secondly, those skilled in the art should also know that all the embodiments described in the specification belong to preferred embodiments. The related actions and modules are not necessarily needed for the present application.

Through the description of the embodiments, a person skilled in the art can clearly understand that the method according to the embodiments can be implemented by means of software plus a necessary general hardware platform. Certainly, the hardware can also be used, but the former is a better implementation in many cases. Based on such understanding, the essence of the technical solution of the present application or the part that makes contributions to the prior art may be embodied in the form of a software product. The computer software product is stored in a storage medium (for example, a ROM/RAM, a magnetic disk, or an optical disk), and includes several instructions for instructing a terminal apparatus (which may be a mobile phone, a computer, a server, a network apparatus, or the like) to execute the methods described in the embodiments of the present application.

Figure 10:
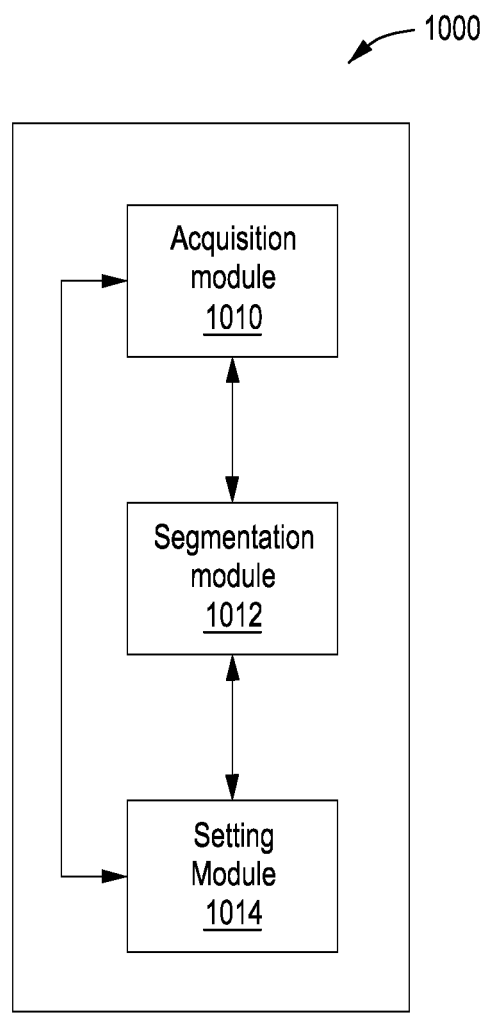
FIG. 10 is a block diagram illustrating an example of a task processing device 1000 in accordance with the present application.

FIG. 10 shows a block diagram that illustrates an example of a task processing device 1000 in accordance with the present application. As shown in FIG. 10, device 1000 includes an acquisition module 1010 that acquires a plurality of tasks, a segmentation module 1012 that segments a computing resource according to an operating quantity of the plurality of tasks, and a setting module 1014 that sets input operands according to a segmentation result. Acquisition module 1010, segmentation module 1012, and setting module 1014 correspond to step 910 to step 916 in method 900.

As an alternative embodiment, the aforementioned device further includes: a control module, configured to control, according to a setting result of the input operands, corresponding sub-modular multipliers to perform modular multiplication on each task respectively, wherein sub-modular multipliers are cascaded to form a multi-stage modular multiplier.

As an alternative embodiment, the aforementioned device further includes a determining module that determines a total number of shifters for segment exponents according to a maximum bit width of hardware and a minimum bit width of each segment before the plurality of tasks are acquired, and performs the segmentation operation according to the operating quantity of the tasks, and the segmentation result is obtained.

As an alternative embodiment, segmentation is performed on the plurality of shifters for segment exponents based on the operating quantity of the tasks and a bit width of each task. The segmentation result refers to segments allocated to each task, and each segment includes a corresponding number of shifters for segment exponents.

As an alternative embodiment, correction gating controls between any two adjacent segments are in an OFF state, and correction gating controls between shifters for segment exponents comprised within each segment are in an ON state and have linear displacement. As an alternative embodiment, whether to perform cross-segment shifting between any two adjacent segments is controlled through a first correction gating control signal of the controller.

As an alternative embodiment, the setting module includes a segmentation sub-module that segments the input operands according to the segments allocated to each task. Segment outputs of the input operands are connected to corresponding sub-modular multipliers after the input operands are set according to the segmentation result.

As an alternative embodiment, the control module includes a determining sub-module that segments the multi-stage modular multiplier according to the segments allocated to each task, and determines a segmenting sub-modular multiplier corresponding to each task. In addition, the computing module performs modular multiplication using the segmenting sub-modular multipliers corresponding to each task.

As an alternative embodiment, correction gating controls between any two adjacent segmenting sub-modular multipliers are in an OFF state, while correction gating controls between sub-modular multipliers comprised within each segmenting sub-modular multiplier are in an ON state. The carry result of a low-byte sub-modular multiplier is transferred to a high-byte sub-modular multiplier for offset correction. Any segmenting sub-modular multiplier is controlled, through a second correction gating control signal of the controller, to use a previous-stage modular multiplication carry term as a next-stage modular multiplication offset term.

This embodiment of the present application may provide a terminal, which includes: a processor; and a memory, connected to the processor and configured to provide the processor instructions for processing the following processing steps: acquiring a plurality of tasks; segmenting a computing resource according to an operating quantity of the plurality of tasks; and setting input operands according to a segmentation result.

This embodiment of the present application may provide a computer terminal, and the computer terminal may be any computer terminal apparatus in a computer terminal group. Alternatively, in this embodiment, the aforementioned computer terminal may be replaced with a terminal apparatus such as a mobile terminal.

Alternatively, in this embodiment, the aforementioned computer terminal may be located in at least one network apparatus in a plurality of network apparatuses of a computer network. In this embodiment, the aforementioned computer terminal may execute program codes of the following steps in the task processing method: acquiring a plurality of tasks; segmenting a computing resource according to an operating quantity of the plurality of tasks; and setting input operands according to a segmentation result.

Figure 11:
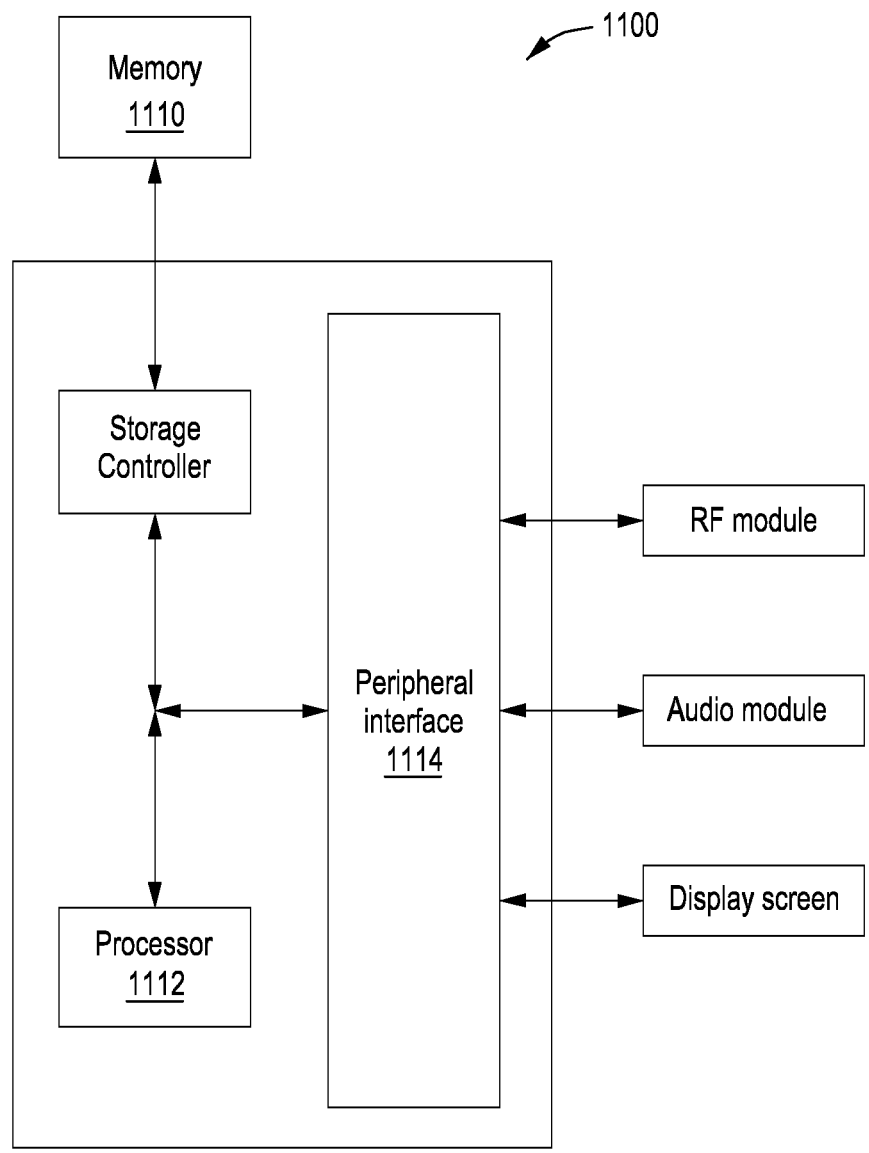
FIG. 11 is a block diagram illustrating an example of a computer terminal 1100 in accordance with the present application.

FIG. 11 is a block diagram illustrating an example of a computer terminal 1100 in accordance with the present application. As shown in FIG. 11, computer terminal 1100 includes a memory 1110, a processor 1112 (multiple processor can alternately be used), and a peripheral interface 1114. Memory 1110 can be configured to store software programs and modules, such as program instructions/modules corresponding to the task processing method and device in the embodiments of the present application.

Processor 1112 runs the software programs and modules stored in the memory so as to execute various functional applications and data processing, i.e., implement the aforementioned task processing method. Memory 1110 can include a high-speed random access memory, and can also include a non-volatile memory such as one or more magnetic storage devices, flash memory, or other non-volatile solid-state memories. In some examples, memory 1110 can further include memories arranged remotely with respect to the processor. The remote memories may be connected to the computer terminal A via a network. Examples of such networks include, but are not limited to, the Internet, intranets, local area networks, mobile communication networks, and the combinations thereof.

Processor 1112 can invoke information and applications stored in the memory through the transmission device to perform the following steps: acquiring a plurality of tasks; segmenting a computing resource according to an operating quantity of the plurality of tasks; and setting input operands according to a segmentation result. Alternatively, processor 1112 can further execute program code of the following step: controlling, according to a setting result of the input operands, corresponding sub-modular multipliers to perform modular multiplication on each task respectively, wherein sub-modular multipliers are cascaded to form a multi-stage modular multiplier.

Alternatively, processor 1112 can further execute program code of the following step, before the acquiring a plurality of tasks, the method further includes: determining a total number of shifters for segment exponents according to a maximum bit width of hardware and a minimum bit width of each segment. Alternatively, processor 1112 can further execute program code of the following step: performing segmentation on the plurality of shifters for segment exponents based on the operating quantity of the tasks and a bit width of each task. The segmentation result refers to segments allocated to each task, and each segment includes a corresponding number of shifters for segment exponents.

Alternatively, processor 1112 can further execute program code of the following step: correction gating controls between any two adjacent segments are in an OFF state, and the correction gating controls between shifters for segment exponents included within each segment are in an ON state and has linear displacement. Alternatively, processor 1112 can further execute program code of the following step: controlling, through a first correction gating control signal of the controller, whether to perform cross-segment shifting between any two adjacent segments.

Alternatively, processor 1112 can further execute program code of the following step, the setting input operands according to a segmentation result includes: segmenting the input operands according to the segments allocated to each task, and segment outputs of the input operands are connected to corresponding sub-modular multipliers after the input operands are set according to the segmentation result.

Alternatively, processor 1112 can further execute program codes of the following steps: segmenting the multi-stage modular multiplier according to the segments allocated to each task; determining segmenting sub-modular multipliers corresponding to each task; and respectively perform modular multiplication using the segmenting sub-modular multipliers corresponding to each task.

Alternatively, processor 1112 can further execute program code of the following step: correction gating controls between any two adjacent segmenting sub-modular multipliers are in an OFF state, while correction gating controls between sub-modular multipliers comprised within each segmenting sub-modular multiplier are in an ON state. A carry result of a low-byte sub-modular multiplier is transferred to a high-byte sub-modular multiplier for offset correction.

Alternatively, processor 1112 can further execute program code of the following step: controlling, through a second correction gating control signal of the controller, any segmenting sub-modular multiplier to use a previous-stage modular multiplication carry term as a next-stage modular multiplication offset term.

A task processing solution is provided in this embodiment of the present application. A segmentation operation is performed on hardware. That is, a computing resource is segmented through an operating quantity of tasks to achieve parallel reconstruction of an RSA operation module so that the RSA operation module can dynamically configure corresponding computing resources according to tasks to support parallel processing of a plurality of computing tasks. Further, the present application can utilize computing resources to its greatest extent for computing tasks requiring large computation such as short word length or hybrid word length. Accordingly, the technical problem that a task processing is performed based on different word lengths in the prior art which results in waste of computing resources is resolved.

Those of ordinary skill in the art can understand that the structure shown in FIG. 11 is merely illustrative, and that computer terminal 1100 can also be a terminal apparatus such as a smart phone (for example, an Android phone or an iOS phone), a tablet computer, a palm computer, a mobile Internet device (MID), or a PAD. FIG. 11 does not limit the structure of the aforementioned electronic device. For example, computer terminal 1100 can also include more or fewer components than those shown in FIG. 11 (for example, a network interface or a display device), or have a different configuration from that shown in FIG. 11.

Those of ordinary skill in the art can understand that all or some of the steps in various methods in the above embodiments can be completed through a program instructing hardware related to a terminal apparatus. The program can be stored in a computer-readable storage medium. The storage medium can include a flash disk, a read-only memory (ROM), a random access memory (RAM), a magnetic disk, or an optical disk.

In an alternate embodiment of the present application, a storage medium is provided. Alternatively, in this embodiment, the aforementioned storage medium can be configured to store the program code executed by the task processing in the aforementioned methods. Alternatively, in this embodiment, the storage medium can be located in any computer terminal in a computer terminal group of a computer network, or located in any mobile terminal in a mobile terminal group.

Alternatively, in this embodiment, the storage medium is configured to store program code for performing the following steps: acquiring a plurality of tasks; segmenting a computing resource according to an operating quantity of the plurality of tasks; and setting input operands according to a segmentation result. The sequence numbers of the foregoing embodiments of the present application are merely for description and do not indicate advantages or disadvantages of the embodiments. In the foregoing embodiments of the present application, the description of each embodiment has its own emphasis. For a part not described in detail in one embodiment, reference may be made to relevant description of other embodiments.

In the several embodiments provided by the present application, it should be understood that the disclosed technical content may be implemented in other manners. The device embodiment described above is merely exemplary. For example, the division of the units is merely a logical function division. Other divisions in practical implementation may exist, like a plurality of units or components can be combined or can be integrated into another system; or some features can be ignored or not executed. Additionally, the intercoupling, direct coupling, or communication connection displayed or discussed can be electrical or other forms through some interfaces, indirect coupling or communication connection of the units or the modules.

The units described as separate parts may or may not be physically separated. The parts shown as units may or may not be physical units, which may be located in one place or may be distributed onto a plurality of network units. The objective of the solution of this embodiment can be achieved by selecting part or all of the units according to actual requirements.

In addition, each functional unit in each embodiment of the present application may be integrated in one processing unit, or each unit may exist physically independently, or two or more units may be integrated in one unit. The integrated unit may be implemented in the form of hardware, and may also be implemented in the form of a software functional unit.

The integrated unit, if implemented in the form of a software functional unit and sold and sold or used as an independent product, can be stored in a computer-readable storage medium. Based on such understanding, the essence of the technical solution of the present application or the part that makes contributions to the prior art or all or part of the technical solution may be embodied in the form of a software product.

The computer software product is stored in a storage medium, and includes several instructions for instructing a computer apparatus (which may be a personal computer, a server, a network apparatus, or the like) to perform all or part of the steps of the methods described in various embodiments of the present application. The storage medium includes: a USB flash disk, a read-only memory (ROM), a random access memory (RAM), a mobile hard disk drive, a magnetic disk, an optical disk, or any other medium that can store program code.

The above descriptions are only preferred implementations of the present application. It should be noted that those of ordinary skill in the art can also make several improvements and modifications without deviating from the principle of the present application. These improvements and modifications can also be considered as falling within the protection scope of the present invention.

What is claimed is:

1. A computing device for processing multiple bit-sized computing tasks, the computing device comprising:
   a plurality of x-bit shift registers coupled in series, a number of the plurality of x-bit shift registers being gated such that an output value of an x-bit shift register is directed to a next-register output or a controller output in response to a gating signal, the next-register output being coupled to a next x-bit shift register in the series;
   a first n-bit operand register having a plurality of x-bit operand segments;
   a second n-bit operand register having a plurality of x-bit operand segments;
   a plurality of modular multipliers coupled to the plurality of x-bit operand segments in the first and second n-bit operand registers such that each of the plurality of modular multipliers has an input coupled to a x-bit operand segment of the plurality of x-bit operand segments of the first n-bit operand register and an input coupled to a corresponding x-bit operand segment of the plurality of x-bit operand segments of the second n-bit operand register;

a controller coupled to the plurality of x-bit shift registers, the first n-bit operand register, the second n-bit operand register, and the plurality of modular multipliers, the controller is configured to:
receive a first task having y bits and a second task having z bits;
divide the y-bit first task into a first plurality of x-bit segments, and the z-bit second task into a second plurality of x-bit segments; and
load the first plurality of x-bit segments into a first group of shift registers of the plurality of x-bit shift registers such that each x-bit segment of the first plurality of x-bit segments is loaded into a corresponding x-bit shift register in the first group of shift registers, and the second plurality of x-bit segments into a second group of shift registers of the plurality of x-bit shift registers such that each x-bit segment of the second plurality of x-bit segments is loaded into a corresponding x-bit shift register in the second group of shift registers.

2. The computing device of claim 1, wherein the controller is further configured to set a first number of gating signals such that the first group of shift registers are serially connected and only a last shift register of the first group of shift registers is output to the controller, and a second number of gating signals such that the second group of shift registers are serially connected and only a last shift register of the second group of shift registers is output to the controller.

3. The computing device of claim 2, wherein the controller is further configured to shift the first plurality of x-bit segments in the first group of shift registers, and the second plurality of x-bit segments in the second group of shift registers.

4. The computing device of claim 3, wherein the controller is further configured to load the output of the last shift register from the first group of shift registers into the first and second n-bit operand registers, and the output of the last shift register from the second group of shift registers into the first and second n-bit operand registers.

5. The computing device of claim 4, wherein the controller is further configured to output a multiply signal to the plurality of modular multipliers such that each of the plurality of modular multipliers multiplies a x-bit operand segment from the first n-bit operand register with a corresponding x-bit operand segment from the second n-bit operand register.

6. The computing device of claim 4, further comprising a register file coupled to the controller, wherein the register file is configured to store base numbers, exponents, moduli, and intermediate computing task results.

7. The computing device of claim 4, wherein n bits include 4096 bits and x bits include 512 bits.

8. A method of operating a computing device for processing multiple bit-sized computing tasks, the method comprising:
receiving a first task having y bits and a second task having z bits;
dividing the y-bit first task into a first plurality of x-bit segments, and the z-bit second task into a second plurality of x-bit segments;
loading the first plurality of x-bit segments into a first group of shift registers of a plurality of x-bit shift registers such that each x-bit segment of the first plurality of x-bit segments is loaded into a corresponding x-bit shift register in the first group of shift registers, and the second plurality of x-bit segments into a second group of shift registers of the plurality of x-bit shift registers such that each x-bit segment of the second plurality of x-bit segments is loaded into a corresponding x-bit shift register in the second group of shift registers;
loading an output from the first group of shift registers into a first and second n-bit operand registers, and an output from the second group of shift registers into the first and second n-bit operand registers; and
outputting a signal to a plurality of modular multipliers such that each of the plurality of modular multipliers multiplies a x-bit operand segment from the first n-bit operand register with a corresponding x-bit operand segment from the second n-bit operand register.

9. The method of claim 8, further comprising setting a first number of gating signals such that the first group of shift registers are serially connected and only a last shift register of the first group of shift registers is output to the controller, and a second number of gating signals such that the second group of shift registers are serially connected and only a last shift register of the second group of shift registers is output to the controller.

10. The method of claim 9, further comprising shifting the first plurality of x-bit segments in the first group of shift registers, and the second plurality of x-bit segments in the second group of shift registers.

11. The method of claim 10, wherein loading the output from the first group of shift registers into the first and second n-bit operand registers, and the output from the second group of shift registers into the first and second n-bit operand registers includes loading the output of the last shift register from the first group of shift registers into the first and second n-bit operand registers, and the output of the last shift register from the second group of shift registers into the first and second n-bit operand registers.

12. The method of claim 8, further comprises storing base numbers, exponents, moduli, and intermediate computing task results from multiplying x-bit segments.

13. The method of claim 8, wherein n bits include 4096 bits and x bits include 512 bits.

14. A non-transitory computer-readable storage medium having embedded therein program instructions, which when executed by a processor causes the processor to execute a method of operating a computing device, the method comprising:
receiving a first task having y bits and a second task having z bits;
dividing the y-bit first task into a first plurality of x-bit segments, and the z-bit second task into a second plurality of x-bit segments;
loading the first plurality of x-bit segments into a first group of shift registers of a plurality of x-bit shift registers such that each x-bit segment of the first plurality of x-bit segments is loaded into a corresponding x-bit shift register in the first group of shift registers, and the second plurality of x-bit segments into a second group of shift registers of the plurality of x-bit shift registers such that each x-bit segment of the second plurality of x-bit segments is loaded into a corresponding x-bit shift register in the second group of shift registers;
loading an output from the first group of shift registers into a first and second n-bit operand registers, and an output from the second group of shift registers into the first and second n-bit operand registers; and outputting a signal to a plurality of modular multipliers such that each of the plurality of modular multipliers multiplies a x-bit operand segment from the first n-bit operand register with a corresponding x-bit operand segment from the second n-bit operand register.

15. The medium of claim 14, wherein the method further comprises setting a first number of gating signals such that the first group of shift registers are serially connected and only a last shift register of the first group of shift registers is output to the controller, and a second number of gating signals such that the second group of shift registers are serially connected and only a last shift register of the second group of shift registers is output to the controller.

16. The medium of claim 15, wherein the method further comprises shifting the first plurality of x-bit segments in the first group of shift registers, and the second plurality of x-bit segments in the second group of shift registers.

17. The medium of claim 16, wherein loading the output from the first group of shift registers into the first and second n-bit operand registers, and the output from the second group of shift registers into the first and second n-bit operand registers includes loading the output of the last shift register from the first group of shift registers into the first and second n-bit operand registers, and the output of the last shift register from the second group of shift registers into the first and second n-bit operand registers.

18. The medium of claim 17, wherein n bits include 4096 bits and x bits include 512 bits.

* * * * *